(12) United States Patent
Tamaoki

(10) Patent No.: US 7,609,438 B2
(45) Date of Patent: Oct. 27, 2009

(54) OPTICAL AMPLIFIER

(75) Inventor: Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 121 days.

(21) Appl. No.: 11/878,801

(22) Filed: Jul. 26, 2007

(65) Prior Publication Data
US 2008/0024859 A1    Jan. 31, 2008

(30) Foreign Application Priority Data
Jul. 27, 2006 (JP) .............................. 2006-204898

(51) Int. Cl.
*H04B 10/17* (2006.01)
*H04B 10/12* (2006.01)
(52) U.S. Cl. ............................ 359/341.31; 359/341.41
(58) Field of Classification Search ............ 359/341.41, 359/341.31
See application file for complete search history.

(56) References Cited

U.S. PATENT DOCUMENTS

| | | | | |
|---|---|---|---|---|
| 6,396,625 | B1 * | 5/2002 | Nakaji | 359/341.41 |
| 6,476,961 | B1 * | 11/2002 | Ye et al. | 359/341.43 |
| 6,678,088 | B1 * | 1/2004 | Stummer et al. | 359/341.41 |
| 6,687,049 | B1 * | 2/2004 | Sulhoff et al. | 359/341.4 |
| 2002/0089738 | A1 * | 7/2002 | Kanda | 359/341.3 |

FOREIGN PATENT DOCUMENTS

JP        2001352297 A  * 12/2001

OTHER PUBLICATIONS

Haruo Nakaji et al., High-Speed Automatically Gain Controlled EDFAs, Technical Report of IEICE, Nov. 2001, pp. 13-18, The Institute of Electronics, Information and Communication Engineers.
Haruo Nakaji et al., Dynamic Gain Excursion Suppression in High-Speed Automatically Gain Controlled EDFAs Using an Optical Delay Line, Optical Amplifiers and Their Applications, Jul. 1-4, 2001, pp. 1-3, Optical Society of America, Stresa, Italy.

* cited by examiner

*Primary Examiner*—Eric Bolda
(74) *Attorney, Agent, or Firm*—Venable LLP; Michael A. Sartori; Steven J. Schwarz (57) ABSTRACT

The present invention relates to an optical amplifier provided with a plurality of optically cascade-connected amplification units and also with a structure for enabling suppression of transient gain variations as a whole. Each of the plurality of amplification units in the optical amplifier has a pumping light source and an amplifying optical fiber, and at least one selected from the plurality of amplification units includes a timing adjustment system for temporally moving back or forth the variation timing of pumping light power accompanying the signal light power variation due to the variation of the number of signal channels, with respect to the variation timing of signal light power at a light incident end of the amplifying optical fiber contained in the own amplification unit.

5 Claims, 11 Drawing Sheets

Fig.11

OPTICAL AMPLIFIER

BACKGROUND OF THE INVENTION

1. Field of the Invention

The present invention relates to an optical amplifier configured by optically cascade-connecting a plurality of amplification units each including a pumping light source and an amplifying optical fiber.

2. Related Background Art

Development of a wavelength division multiplexing (WDM) optical communication system that can perform optical transmission of signal light including one or more signal channels having mutually different wavelengths has actively been promoted. In a photonic network, among others, an optical add/drop multiplexer (OADM) and optical cross-connect (OXC) are provided in a node and thus the number of signal channels included in signal light varies frequently from place to place in a network. Therefore, the number of signal channels in signal light inputted into an optical amplifier provided in such a photonic network may naturally vary. Transient signal light gain variations can be listed as one of important performance evaluation items of an optical amplifier when the number of signal channels of signal light inputted into the optical amplifier varies.

That is, in a photonic network, the power of signal light inputted into an optical amplifier varies resulting from the variation of the number of signal channels. At this point, inside the optical amplifier, a gain of signal light remaining in an amplifying optical fiber varies as signal light power varies. In general, when the input signal light power decreases, a transient gain increase called an overshoot of signal light remaining inside the amplifying optical fiber occurs. When the input signal light power increases, on the other hand, a transient gain decrease called an undershoot occurs.

Both the overshoot and undershoot of gain change are known to adversely affect transmission systems. An overshoot of gain change may cause a receiver to fail due to excessive power input. An undershoot of gain change, on the other hand, may cause a transmission error due to power deterioration out of receivable range. Thus, it becomes necessary to suppress such overshoots and undershoots of gain change.

An optical amplifier generally performs constant gain control by controlling a pumping light power supplied to the amplifying optical fiber from a pumping light source so that a ratio of the input signal light power to the output signal light power reaches a target value while monitoring both the input signal light power and the output signal light power. Suppressing the overshoot and undershoot of gain change by performing pumping light power control at high speed based on the constant gain control was proposed by Haruo Nakaji et al. in "High-speed Automatically Gain Controlled EDFAs", Technical Report of IEICE, OFT, OFT2001-56, pp. 13-18 (2001).

SUMMARY OF THE INVENTION

The present inventors have examined the above conventional art, and as a result, have discovered the following problems.

Namely, in an optical amplifier in which a plurality of amplification units each including a pumping light source and an amplifying optical fiber are optically cascade-connected, a transient gain variation of each of the plurality of cascade-connected amplification units is accumulated even if a transient gain variation is suppressed by performing constant gain control at high speed for each amplification unit. Thus, the transient gain variations may become large for the optical amplifier as a whole. In such cases, an optical communication system may adversely be affected.

The present invention has been made to solve the above problem and an object thereof is to provide an optical amplifier that, in a configuration in which a plurality of amplification units each including a pumping light source and an amplifying optical fiber are optically cascade-connected, enables effective suppression of transient gain variations as a whole.

An optical amplifier according to the present invention is one including a plurality of amplification units optically cascade-connected so that signal light of one or more signal channels having mutually different wavelengths is sequentially amplified. Also, at least one amplification unit selected from the plurality of amplification units includes an optical input end for receiving signal light, an optical output end for outputting the amplified signal light, an amplifying optical fiber, a pumping light source, and a timing adjustment system. Here, the amplifying optical fiber is arranged on an optical path between the optical input end and the optical output end. The pumping light source supplies pumping light entering a light incident end of the amplifying optical fiber together with signal light. Also, the timing adjustment system temporally moves back or forth a variation timing of pumping light power with respect to a variation timing of signal light power at the light incident end of the amplifying optical fiber. The variation timing of pumping light accompanies the signal light power variation due to the variation of the number of signal channels.

Particularly, the optical amplifier according to the present amplifier at least includes one amplification unit which is set so that the variation timing of pumping light power at the light incident end of the amplifying optical fiber included therein is prior to that of signal light power, and a different amplification unit which is set so that the variation timing of pumping light power at the light incident end of the amplifying optical fiber included in the amplification unit is posterior to that of signal light power.

Also, the optical amplifier according to the present invention may include a first optical component for delaying amplification light from a front-stage amplification unit provided between a light outgoing end of the amplifying optical fiber included in the front-stage amplification unit and the light incident end of the amplifying optical fiber included in a rear-stage amplification unit, in a configuration of two adjacent amplification units selected from the plurality of amplification units. More specifically, the first optical component includes a delay fiber for delaying the amplification light from the front-stage amplification unit.

The optical amplifier according to the present invention includes a control circuit for controlling a pumping light source. In this configuration, the timing adjustment system preferably includes a timing adjustment circuit for controlling the variation timing of pumping light power in the control circuit.

In the optical amplifier according to the present invention, the selected amplification unit may further include a branch unit arranged between the optical input end and the light incident end of the amplifying optical fiber included in the amplification unit for branching part of input light and an input monitor for monitoring the part of the input light from the branch unit. Also, in this configuration, the timing adjustment system may include a second optical component, which is provided between the branch unit and the input monitor and used for securing a delay time of the variation timing of pumping light power with respect to that of signal light power. Incidentally, the second optical component includes a delay fiber.

The optical amplifier according to the present invention may also include a third optical component (for example, a delay fiber) provided between the optical output end of the amplifying optical fiber included in one amplification unit of two amplification units selected from the plurality of amplification units and the optical input end of the amplifying optical fiber included in the other amplification unit for delaying propagating signal light by 1 μs or more. In this case, the timing adjustment system delays the variation timing of pumping light power with respect to that of signal light power so that a delay of amplification light provided by the third optical component is complemented.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

In the following, embodiment of an optical amplifier according to the present invention will be explained in detail below with reference to FIGS. 1 to 2, 3A to 4C, 5 to 6, 7A to 8C, and 9 to 11. In the description of the drawings, identical or corresponding components are designated by the same reference numerals, and overlapping description is omitted.

Figure 1:
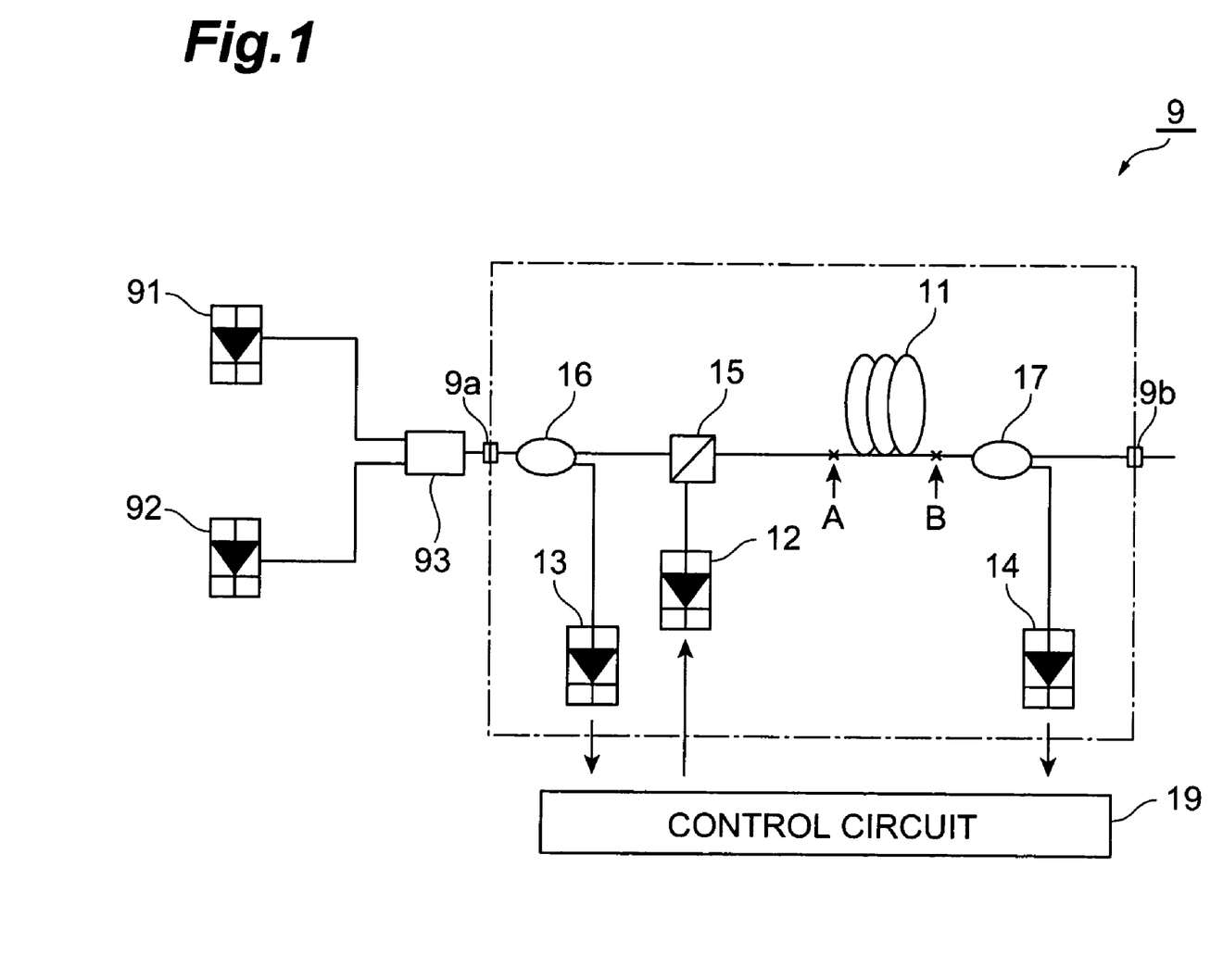
FIG. 1 is a diagram showing a configuration of a single-stage optical amplifier.

FIG. 1 is a diagram showing a single-stage optical amplifier. An optical amplifier 9 shown in FIG. 1 includes a branch coupler 16, a multiplexing coupler 15, an amplifying optical fiber 11 having a light incident end A and a light outgoing end B, and a branch coupler 17 arranged on an optical path from an optical input end 9a to an optical output end 9b in this order. The optical amplifier 9 further includes a pumping light source 12, an input monitor 13, an output monitor 14, and a control circuit 19. Incidentally, FIG. 1 shows, in addition to the optical amplifier 9, a residual signal light source 91, a modulation signal light source 92, and a multiplexing coupler 93.

The signal light (amplified light) outputted from the residual signal light source 91 and the signal light outputted from the modulation signal light source 92 are multiplexed by the multiplexing coupler 93 and then inputted into the optical amplifier 9. In the optical amplifier 9, the pumping light outputted from the pumping light source 12 is supplied to the amplifying optical fiber 11 via the multiplexing coupler 15. The signal light inputted into the optical amplifier 9 from the multiplexing coupler 93 is inputted into the amplifying optical fiber 11 via the branch coupler 16 and the multiplexing coupler 15 and, after being optically amplified by the amplifying optical fiber 11, is outputted via the branch coupler 17.

The part of the signal light inputted into the optical amplifier 9 from the multiplexing coupler 93 is branched by the branch coupler 16 to be received by the input monitor 13, thereby monitoring the input signal light power. Also, the part of the signal light amplified by the amplifying optical fiber 11 is branched by the branch coupler 17 to be received by the output monitor 14, thereby monitoring the output signal light power. Then, the control circuit 19 controls the pumping light power supplied from the pumping light source 12 to the amplifying optical fiber 11 so that the ratio of the input signal light power to the output signal light power becomes a target value for constant gain control.

For example, the amplifying optical fiber 11 is a silica-based optical fiber to which the Er element is doped (EDF: Erbium-Doped Fiber). The pumping light outputted from the pumping light source 12 has a wavelength of 980 nm or 1480 nm. The wavelength of signal light (amplified light) is in a C-band (1530-1560 nm) or L-band (1576-1600 nm). That is, the optical amplifier 9 is an EDFA (Erbium-Doped Fiber Amplifier).

In the configuration described above, transient gain variations in the optical amplifier 9 were examined. That is, while the residual signal light source 91 is caused to always output signal light having a constant power, the signal light (amplified light) inputted into the optical amplifier 9 is temporally intensity-modulated by temporally alternating output and non-output of the signal light with a constant power by the modulation signal light source 92.

Figure 2:
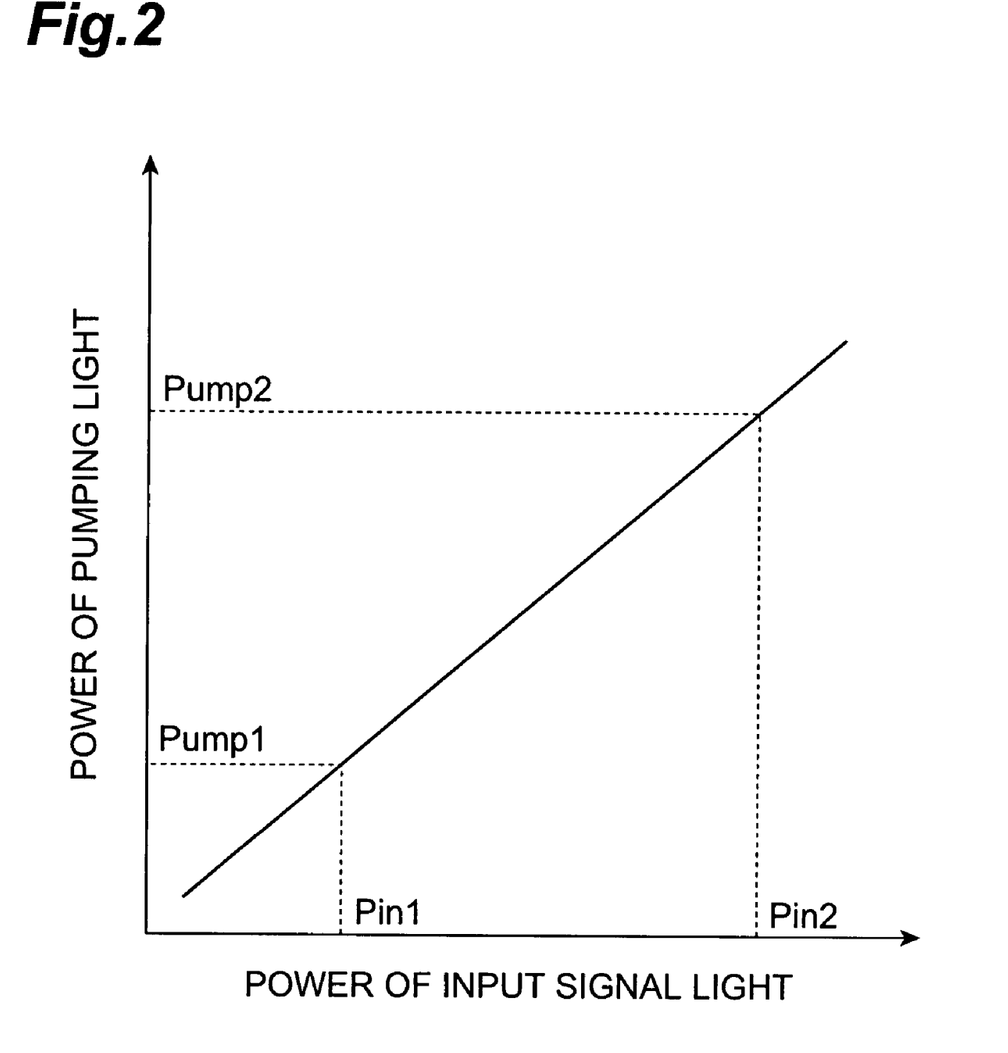
FIG. 2 is a graph showing a relationship between the input signal light power and pumping light power during constant gain control in an EDFA.

FIG. 2 is a graph showing a relationship between the input signal light power and pumping light power during the constant gain control in an EDFA. As shown in FIG. 2, there is a relationship of linear function between the input signal light power and pumping light power during the constant gain control in the EDFA. When, for example, the input signal light power has a value Pin1, the pumping light power is set to a value Pump1 and, when the input signal light power has a value Pin2, the pumping light power is set to a value Pump2. By setting the input signal light power and pumping light power as described above, an approximately constant gain can be maintained. That is, the pumping light power must be controlled at high speed in order to maintain the gain of signal light at high speed and at a fixed level.

FIGS. 3A-3C and 4A-4C are time charts for illustrating transient gain changes of the optical amplifier in FIG. 1. FIG. 5 is a graph showing changes with time of gain of the optical amplifier in FIG. 1. As preconditions for obtaining results shown in FIGS. 3A-3C, 4A-4C, and 5, the power of signal light outputted from the residual signal light source 91 (hereinafter called residual signal light) was set to −21 dBm and the power of signal light outputted from the modulation signal light source 92 (hereinafter called modulation signal light) was set to −5 dBm. The pumping light wavelength is 980 nm and the gain is 21 dB.

Figure 3A:
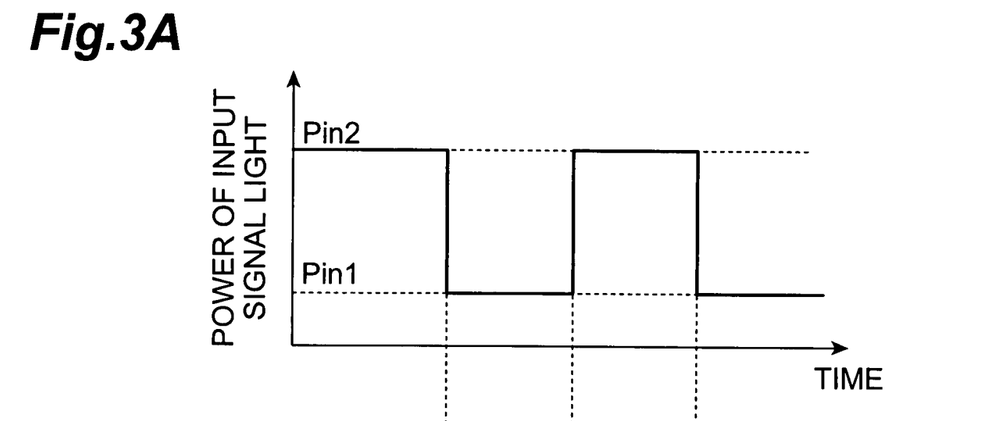
FIGS. 3A to 3C are time charts for illustrating transient gain variations in the optical amplifier in FIG. 1 (part 1)
Figure 3B:
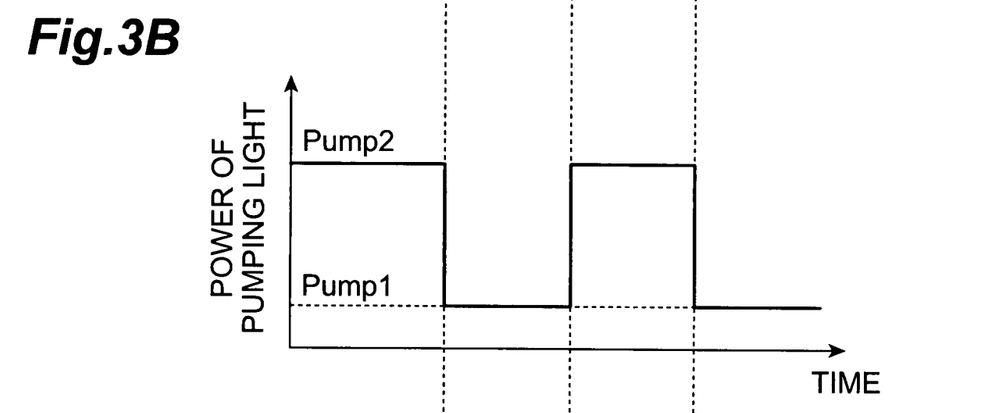
Figure 3C:
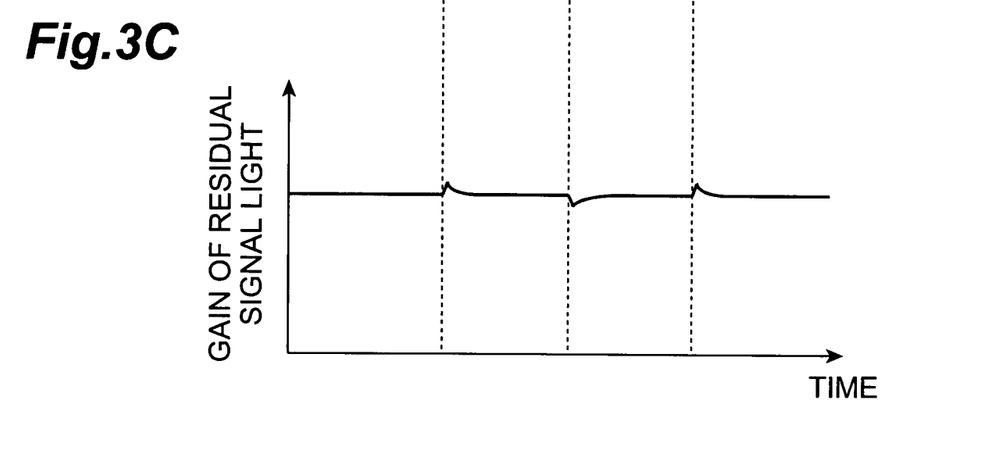
Figure 4A:
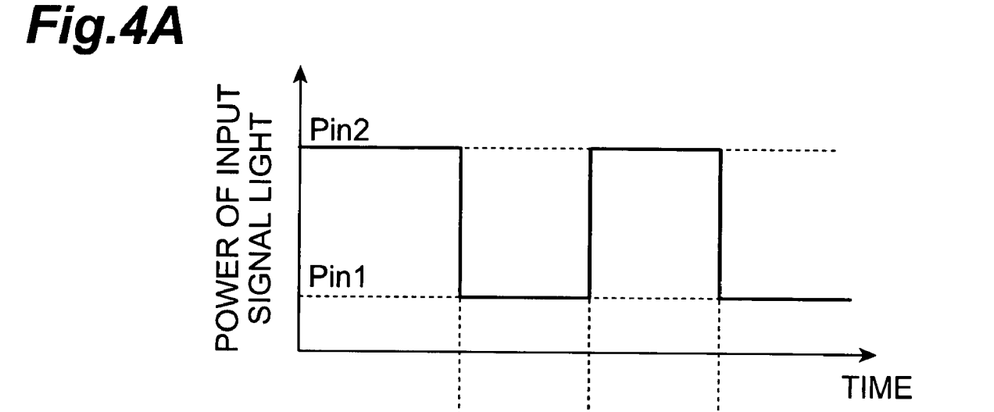
FIGS. 4A to 4C are time charts for illustrating transient gain variations in the optical amplifier in FIG. 1 (part 2)
Figure 4B:
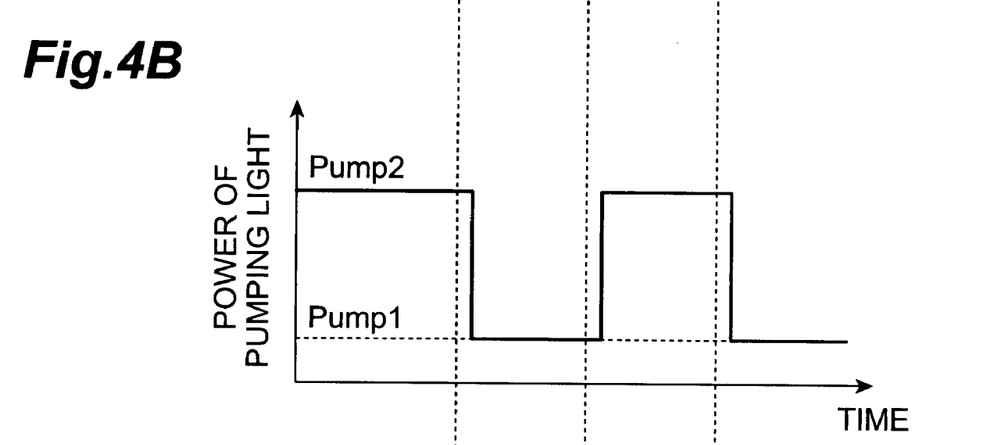
Figure 4C:
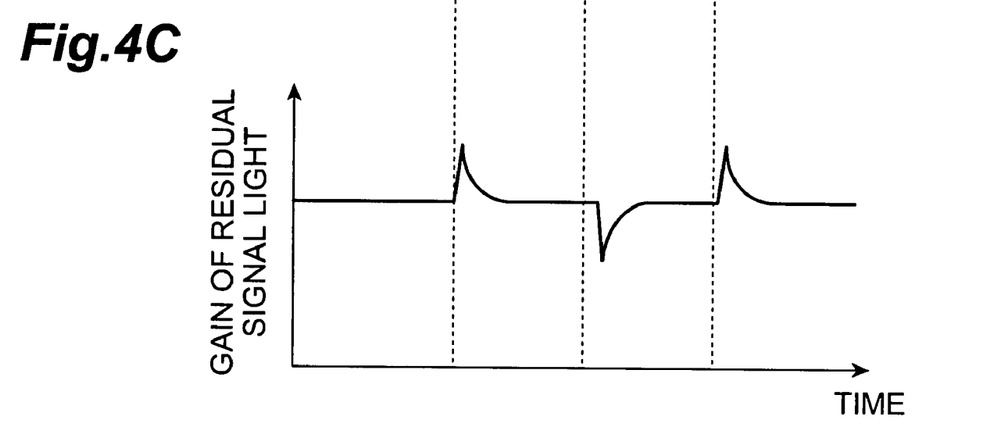
Figure 5:
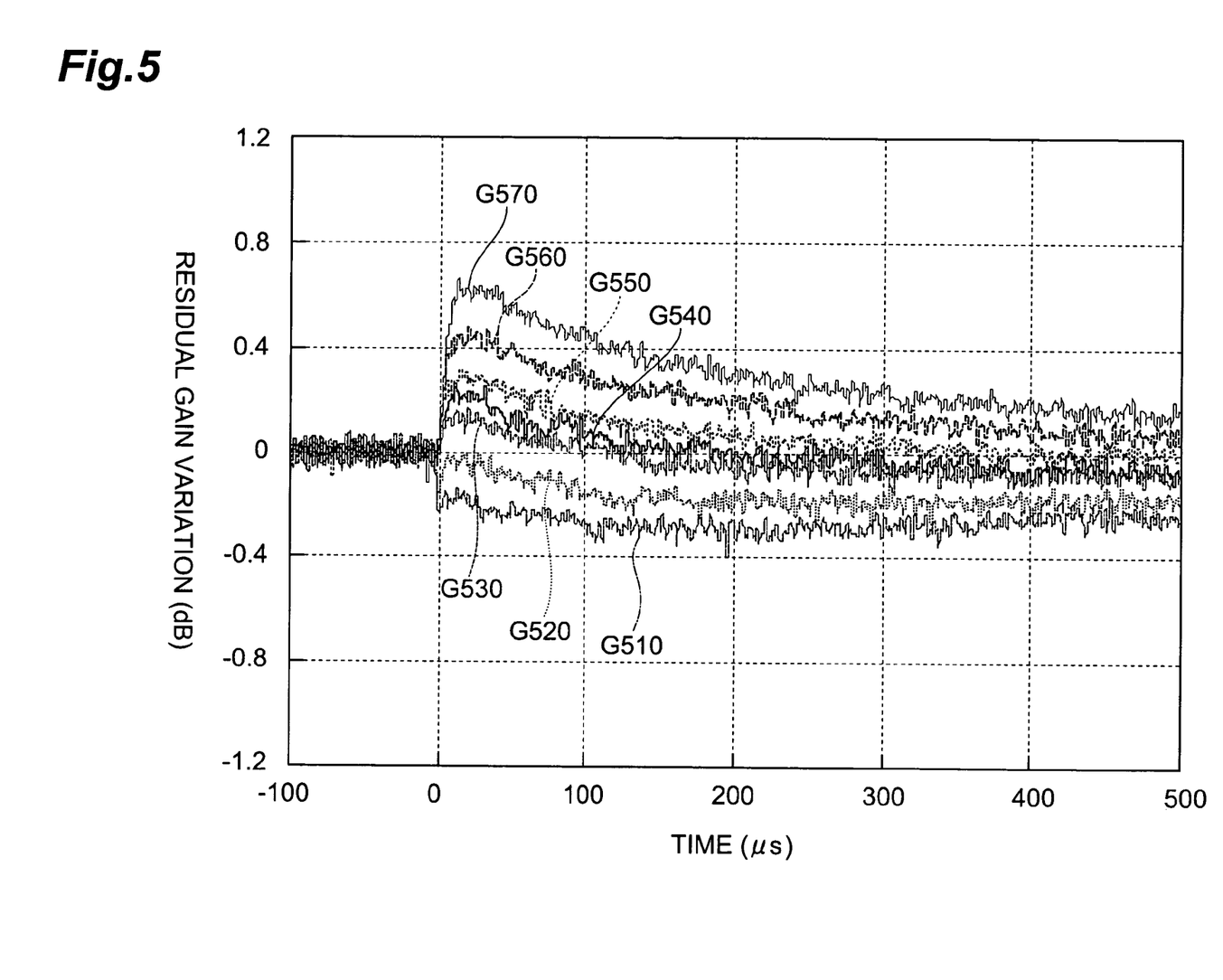
FIG. 5 is a graph showing changes with time of gain of the optical amplifier in FIG. 1.

FIGS. 3A and 4A show changes with time of the input signal light power, FIGS. 3B and 4B show changes with time of the pumping light power, and FIGS. 3C and 4C show gains of the residual signal light. Incidentally, FIGS. 3A-3C show a case in which the variation timing of input signal light power and that of pumping light power match. In contrast, FIGS. 4A-4C show a case in which pumping light power varies after being delayed a fixed time from the variation timing of input signal light power.

In the case shown in FIGS. 3A-3C, the constant gain control is attempted to perform by changing the pumping light power from Pump1 to Pump2 at the same time as the input signal light power changes from Pin1 to Pin2, and changing the pumping light power from Pump2 to Pump1 at the same time as the input signal light power changes from Pin2 to Pin1. However, even when the pumping light power is varied so as to match the variation timing of input signal light power, the signal light remaining in the amplifying optical fiber 11 is amplified, thereby leading to an overshoot or undershoot of gain change. This factor depends on amplification characteristics and pumping wavelengths of a rare earth element doped to the amplifying optical fiber 11 to be used.

In the case shown in FIGS. 4A-4C, the pumping light power is varied after being delayed a fixed time from the variation timing of input signal light power, that is, this case assumes a case actually often observed in which the speed of control of pumping light power is insufficient. Also, in this case, an overshoot or undershoot of gain change may become large.

In FIG. 5 showing changes with time of gain of the optical amplifier 9, the input signal light power was changed from a high state (Pin2) to a low state (Pin1) at time 0 (the reference variation timing of input signal light power). Also, a delay time τ up to the variation timing of pumping light power with reference to the variation timing of input signal light power was changed in the range of −5 µs to +5 µs at the optical input end A of the amplifying optical fiber 11. Incidentally, in FIG. 5, a graph G510 shows a residual gain variation when τ=−5 µs, a graph G520 shows a residual gain variation when τ=−3 µs, a graph G530 shows a residual gain variation when τ=−1 µs, a graph G540 shows a residual gain variation when τ=0 µs (the variation timing of input signal light power and that of pumping light power match), a graph G550 shows a residual gain variation when τ=1 µs, a graph G560 shows a residual gain variation when τ=3 µs, and a graph G570 shows a residual gain variation when τ=5 µs.

As is evident from FIG. 5, an overshoot or undershoot of gain change grows as the delay time τ becomes longer. The overshoot of about −0.47 dB occurred when the delay time τ was −5 µs and an overshoot of about 1.6 dB occurred when the delay time τ was 5 µs. This shows that when the time at which pumping light power is changed is delayed, an undershoot occurs instead of an overshoot.

In the single-stage optical amplifier 9, as described above, a transient gain change overshoots or undershoots depending on the delay time τ from the variation timing of input signal light power to that of pumping light power. Thus, an optical amplifier according to the present invention adopts the configuration in which a plurality of amplification units each including a pumping light source and an amplifying optical fiber are optically cascade-connected and, among the plurality of amplification units, some amplification units are designed so that the transient gain change overshoots and other amplification units are designed so that the transient gain change undershoots, producing a small amount of transient gain change for the whole optical amplifier.

Figure 6:
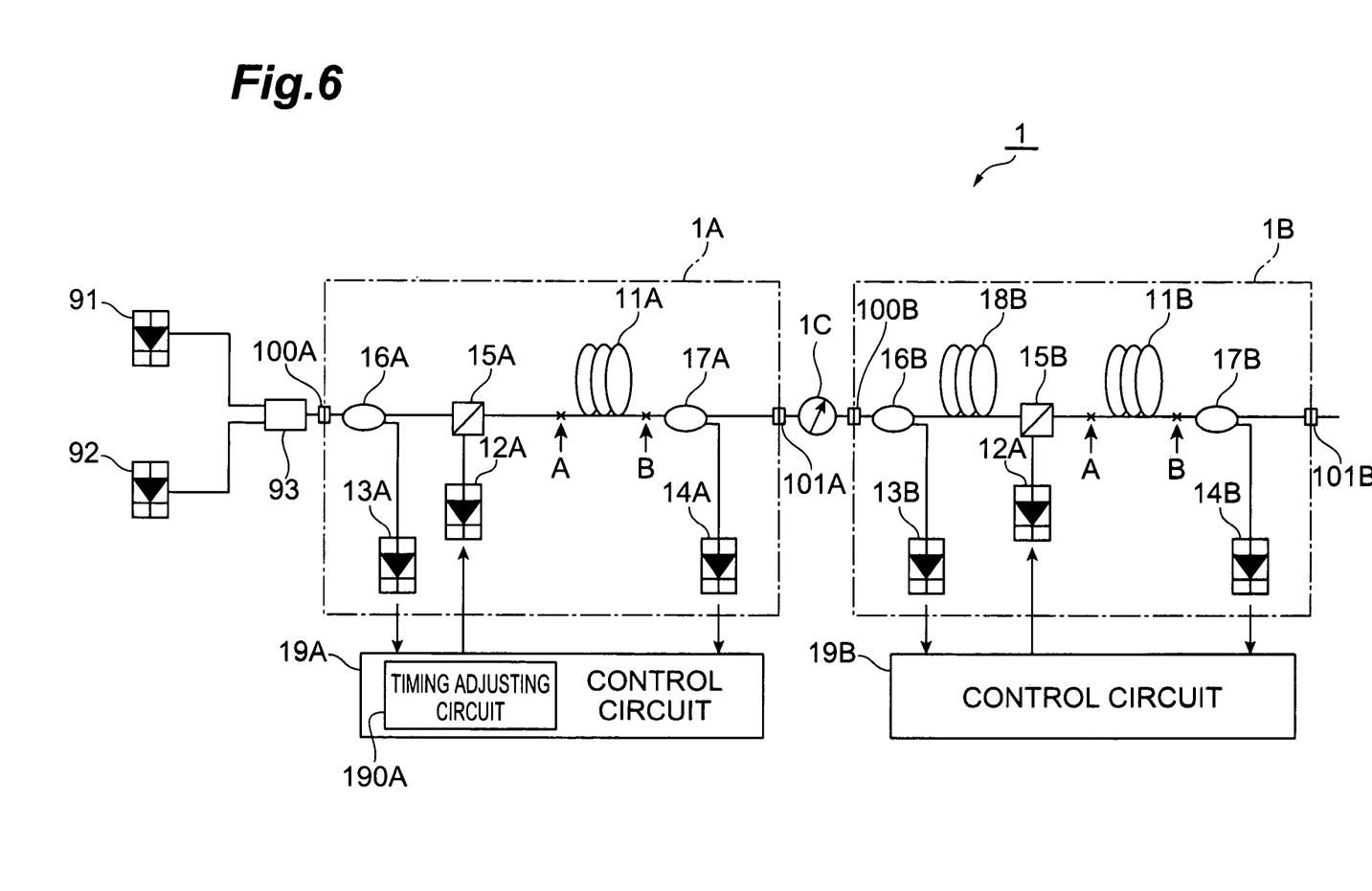
FIG. 6 is a diagram showing the configuration of a first embodiment of an optical amplifier according to the present invention.

FIG. 6 is a diagram showing the configuration of a first embodiment of an optical amplifier according to the present invention. An optical amplifier 1 shown in FIG. 6 includes a first amplification unit 1A, a second amplification unit 1B, a variable optical attenuator 1C, a first control circuit 19A, and a second control circuit 19B. Also, FIG. 6 shows, in addition to the optical amplifier 1, the residual signal light source 91, the modulation signal light source 92, and the multiplexing coupler 93 as well.

The first amplification unit 1A (the upstream side amplification unit when viewed in a propagation direction of signal light) in the front stage includes a branch coupler 16A, a multiplexing coupler 15A, an amplifying optical fiber 11A having the light incident end A and the light outgoing end B, and a branch coupler 17A arranged on an optical path from an optical input end 100A to an optical output end 101A in this order. Further, the first amplification unit 1A in the front stage includes a pumping light source 12A, an input monitor 13A, and an output monitor 14A. The second amplification unit 1B (the downstream side amplification unit when viewed in a propagation direction of signal light) in the rear stage includes a branch coupler 16B, a delay optical fiber 18B, a multiplexing coupler 15B, an amplifying optical fiber 11B having the light incident end A and the light outgoing end B, and a branch coupler 17B arranged on an optical path from an optical input end 100B to an optical output end 101B in this order. Further, the second amplification unit 1B in the rear stage includes a pumping light source 12B, an input monitor 13B, and an output monitor 14B. The variable optical attenuator 1C is inserted between the first amplification unit 1A and the second amplification unit 1B.

The signal light (amplified light) outputted from the residual signal light source 91 and the signal light from the modulation signal light source 92 are multiplexed by the multiplexing coupler 93 and then inputted into the first amplification unit 1A. In the first amplification unit 1A, the pumping light outputted from the pumping light source 12A is supplied to the amplifying optical fiber 11A via the multiplexing coupler 15A. The signal light inputted into the first amplification unit 1A from the multiplexing coupler 93 is inputted into the amplifying optical fiber 11A via the branch coupler 16A and the multiplexing coupler 15A, and then amplified by the amplification optical fiber 11A. After amplified by the amplification optical fiber 11A, the signal light is outputted to the variable optical attenuator 1C from the first amplification unit 1A via the branch coupler 17A.

After attenuated by the variable optical attenuator 1C, the signal light outputted from the first amplification unit 1A is inputted into the second amplification unit 1B. In the second amplification unit 1B, the pumping light outputted from the pumping light source 12B is supplied to the amplifying optical fiber 11B via the multiplexing coupler 15B. The signal light inputted into the second amplification unit 1B is inputted into the amplifying optical fiber 11B via the branch coupler 16B, the delay optical fiber 18B, and the multiplexing coupler 15B, and then amplified by the amplifying optical fiber 11B. After amplified by the amplifying optical fiber 11B, the signal light is outputted from the second amplification unit 1B via the branch coupler 17B.

The part of signal light inputted into the first amplification unit 1A is branched by the branch coupler 16A and then received by the input monitor 13A, thereby monitoring the input signal light power. Also, the part of signal light amplified by the amplifying optical fiber 11A is branched by the branch coupler 17A and then received by the output monitor 14A, thereby monitoring the output signal light power. Then, the control circuit 19A controls the pumping light power supplied from the pumping light source 12A to the amplifying optical fiber 11A so that the ratio of the input signal light power to the output signal light power becomes a target value. The constant gain control is performed in this way within the first amplification unit 1A. Incidentally, in the control circuit 19A, a timing adjustment circuit 190A to delay the variation timing of pumping light power after that of input signal light power at the light incoming terminal of the amplifying optical fiber 11A is provided.

The part of signal light (output signal from the first amplification unit 1A) inputted into the second amplification unit 1B is branched by the branch coupler 16B and then received by the input monitor 13B. The input signal light power is thereby monitored. Also, the part of signal light amplified by the amplifying optical fiber 11B is branched by the branch coupler 17B and then received by the output monitor 14B. The output signal light power is thereby monitored. Then, the control circuit 19B controls the pumping light power supplied from the pumping light source 12B to the amplifying optical fiber 11B so that the ratio of the input signal light power to the output signal light power becomes a target value. The constant gain control is performed in this way within the second amplification unit 1B.

For example, the amplifying optical fibers 11A and 11B are EDFs. The wavelength of pumping light outputted from the pumping light sources 12A, 12B is 980 nm. The wavelength of the signal light (amplified light) is 1530-1560 nm. That is, the amplification units 1A and 1B are EDFAs.

FIGS. 7A-7C and 8A-8C are time charts for illustrating transient gain changes of the optical amplifier according to the first embodiment. FIG. 9 is a graph showing changes with time of gain of the optical amplifier according to the first embodiment. As preconditions for obtaining results shown in FIGS. 7A-7C, 8A-8C, and 9, the power of residual signal light outputted from the residual signal light source 91 was set to −21 dBm and the power of modulation signal light outputted from the modulation signal light source 92 was set to −5 dBm. The pumping light wavelength is 980 nm. The gain of the first amplification unit 1A and the second amplification unit 1B was each 21 dB, the attenuation factor in the variable optical attenuator 1C was 21 dB, and conditions for signal light inputted into the amplification units 1A and 1B were made equal. The signal light propagation time in the delay optical fiber 18B is 8 μs.

Figure 7A:
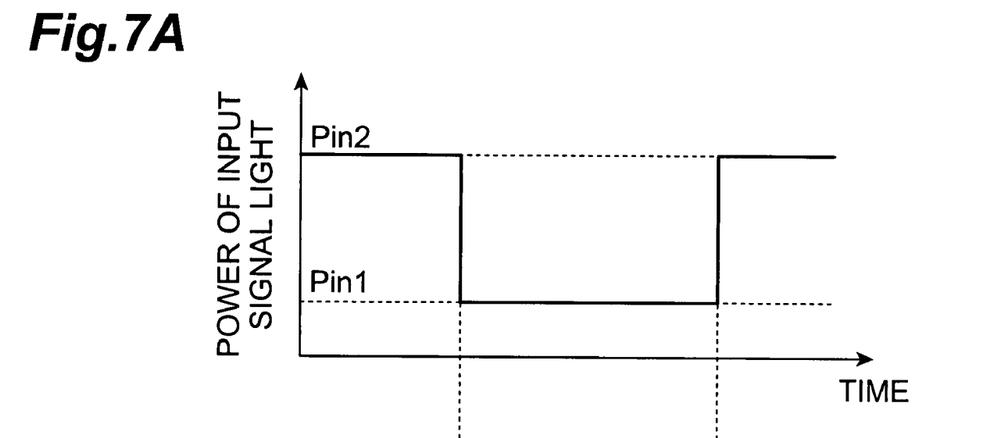
FIGS. 7A to 7C are time charts for illustrating transient gain variations in the optical amplifier according to the first embodiment (part 1)
Figure 7B:
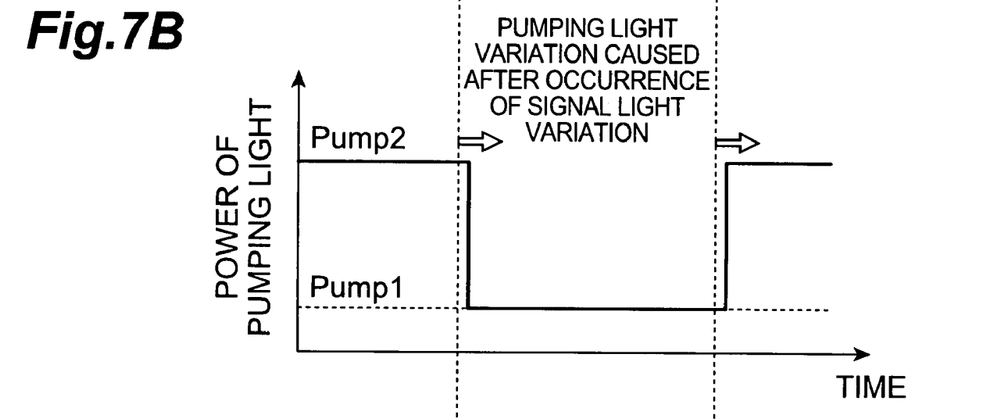
Figure 7C:
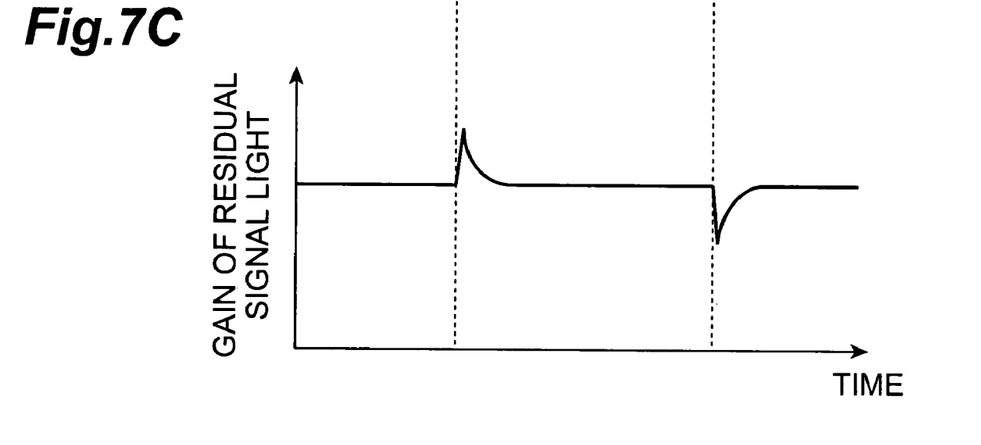
Figure 8A:
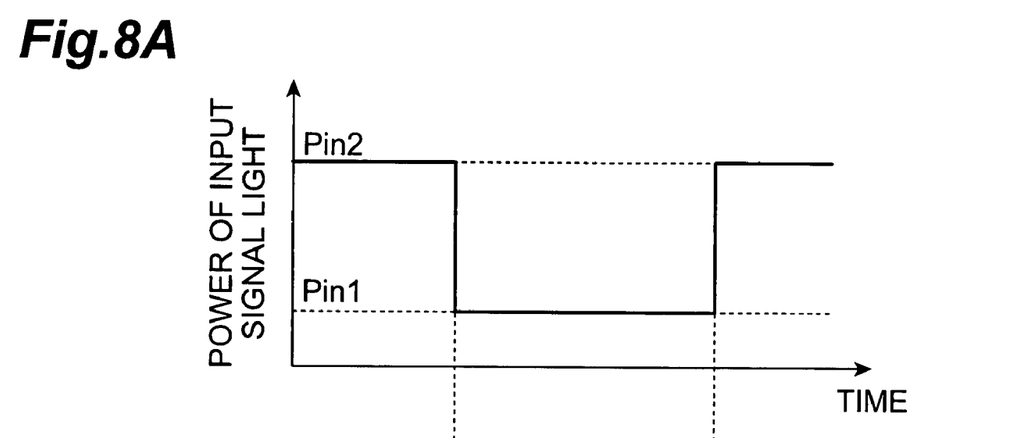
FIGS. 8A to 8C are time charts for illustrating transient gain variations in the optical amplifier according to the first embodiment (part 2)
Figure 8B:
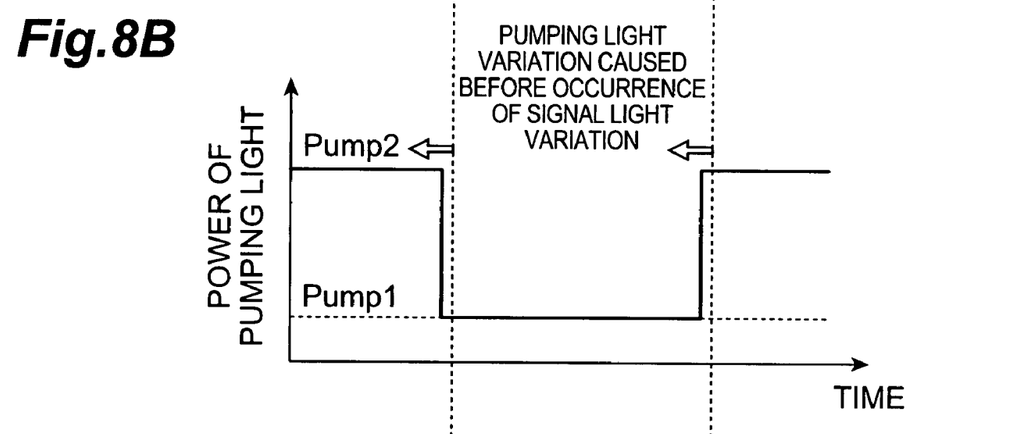
Figure 8C:
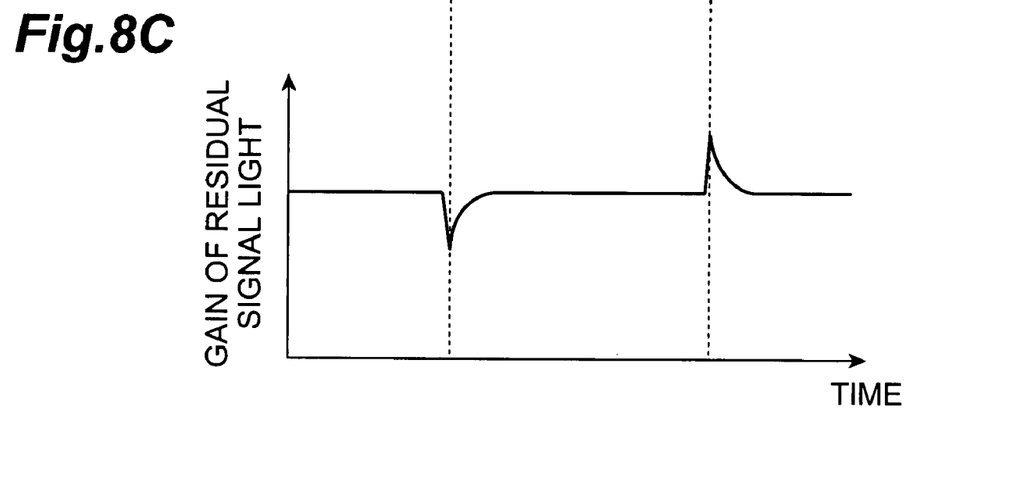
Figure 9:
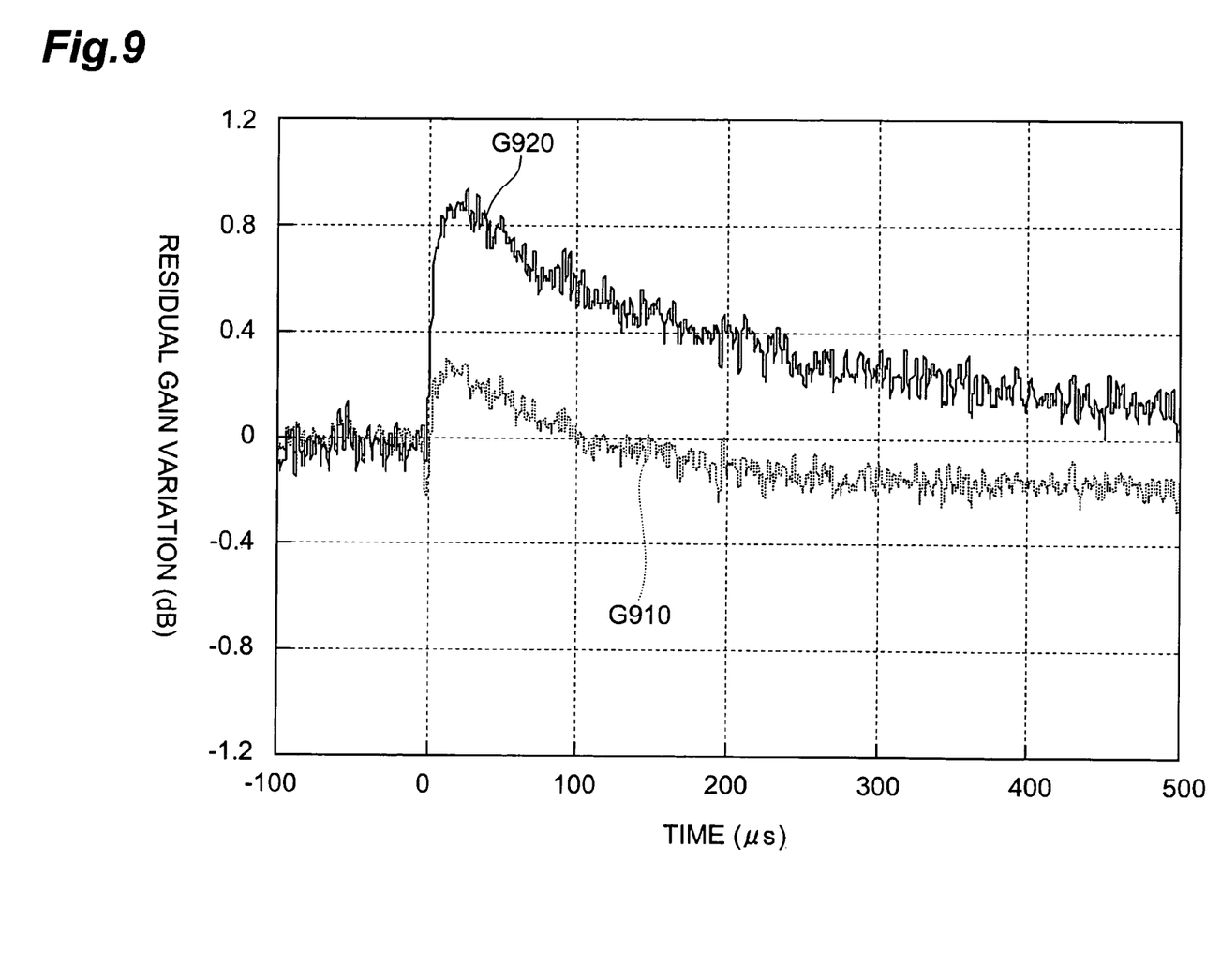
FIG. 9 is a graph showing changes with time of gain of the optical amplifier according to the first embodiment.

FIGS. 7A and 8A show changes with time of the input signal light power, FIGS. 7B and 8B show changes with time of pumping light power, and FIGS. 7C and 8C show gains of residual signal light. Incidentally, FIGS. 7A-7C show transient gain changes in the front-stage first amplification unit 1A. In contrast, FIGS. 8A-8C show transient gain changes in the rear-stage second amplification unit 1B.

As shown in FIGS. 7A-7C and 8A-8C, while the pumping light power is varied after being delayed a fixed time from the variation timing of input signal light power in the front-stage first amplification unit 1A, the pumping light power is varied a fixed time prior to the variation timing of input signal light power in the rear-stage second amplification unit 1B. From the above, the transient gain change undershoots in the rear-stage second amplification unit 1B when the transient gain change overshoots in the front-stage first amplification unit 1A. The transient gain change overshoots in the rear-stage second amplification unit 1B when the transient gain change undershoots in the front-stage first amplification unit 1A. Therefore, the transient gain changes will be small for the optical amplifier 1 according to the first embodiment as a whole.

FIG. 9 is a diagram showing changes with time of gain of the optical amplifier 1 according to the first embodiment. The input signal light power was changed from the high state (Pin2) to the low state (Pin1) at time 0 (the reference variation timing of input signal light power). In FIG. 9, a graph G910 shows a residual gain variation of the optical amplifier 1 according to the first embodiment and graph 920 shows, as a comparative example, a residual gain variation of an optical amplifier having a configuration after eliminating the delay optical fiber 18B from the optical amplifier 1.

As shown in FIG. 9, the amount of overshoot is about 1 dB with the configuration of the comparative example, which is about twice that of the single-stage optical amplifier 9. In contrast, the amount of overshoot is reduced to about 0.3 dB for the optical amplifier 1 having the delay optical fiber 18B, which is smaller than that of the comparative example including no delay optical fiber 18B. As has been described above, transient gain changes of an optical amplifier as a whole can be suppressed by configuring a multi-stage optical amplifier with a plurality of amplification units and adjusting a relationship between variation timing of signal light power and that of pumping light power in the amplifying optical fiber of each amplification unit (adjustments of transient gain changes).

Figure 10:
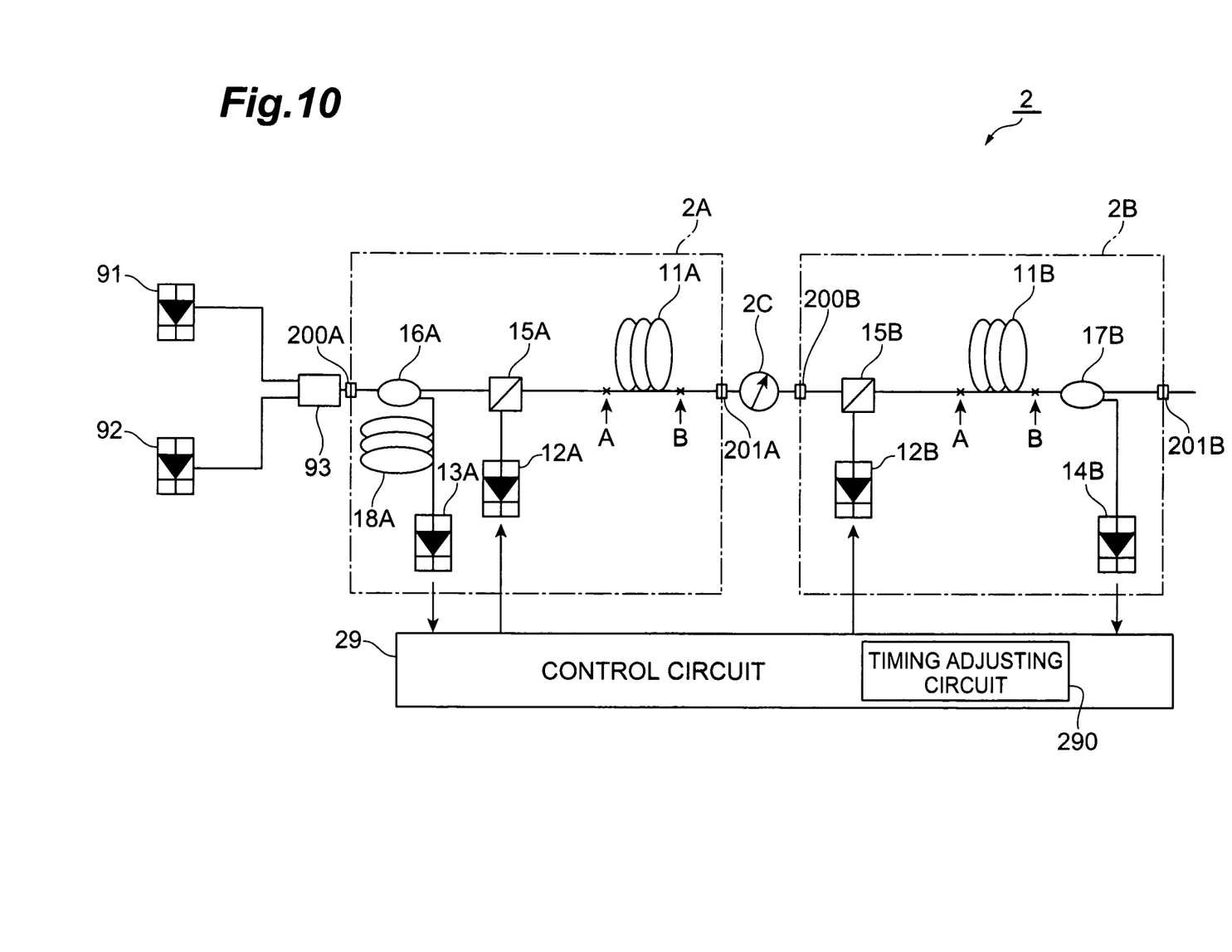
FIG. 10 is a diagram showing the configuration of a second embodiment of an optical amplifier according to the present invention.

FIG. 10 is a diagram showing the configuration of a second embodiment of an optical amplifier according to the present invention. An optical amplifier 2 shown in FIG. 10 includes a first amplification unit 2A, a second amplification unit 2B, a variable optical attenuator 2C, and a control circuit 29. Also, in FIG. 10, in addition to the optical amplifier 2, the residual signal light source 91, the modulation signal light source 92, and the multiplexing coupler 93 are shown as well.

The first amplification unit 2A of the front stage (the amplification unit positioned on the upstream side when viewed in a propagation direction of signal light) includes the branch coupler 16A, the multiplexing coupler 15A, and the amplifying optical fiber 11A having the light incident end A and the light outgoing end B arranged on an optical path from an optical input end 200A to an optical output end 201A in this order. Further, the front-stage first amplification unit 2A includes the pumping light source 12A, the input monitor 13A, and a delay optical fiber 18A. The rear-stage second amplification unit 2B (the amplification unit positioned on the downstream side when viewed in a propagation direction of signal light) includes the multiplexing coupler 15B, the amplifying optical fiber 11B having the light incident end A and the light outgoing end B, and the branch coupler 17B arranged on an optical path from an optical input end 200B to an optical output end 201B in this order. Further, the rear-stage second amplification unit 2B includes the pumping light source 12B, the output monitor 14B, and the multiplexing coupler 15B. The variable optical attenuator 2C is inserted between the first amplification unit 2A and the second amplification unit 2B.

The comparison with the configuration of the optical amplifier 1 according to the first embodiment (FIG. 6) shows that the optical amplifier 2 according to the second embodiment (FIG. 10) is different in that the front-stage first amplification unit 2A includes the delay optical fiber 18A, the front-stage first amplification unit 2A does not include the output monitor 14A and the branch coupler 17A, and the rear-stage second amplification unit 2B does not include the input monitor 13B and the branch coupler 16B and has the control circuit 29 instead of the first control circuit 19A and the second control circuit 19B. In the first amplification unit 2A, the delay optical fiber 18A is inserted between the branch coupler 16A and the input monitor 13A.

That is, in the optical amplifier 2 according to the second embodiment, the constant gain control is performed by the input signal light power being monitored by the input monitor 13A, the output signal light power being monitored by the output monitor 14B, and the pumping light power supplied from the pumping light sources 12A and 12B to the amplifying optical fibers 11A and 11B being controlled by the control circuit 29 so that the ratio of the input signal light power to the output signal light power becomes a target value.

More specifically, in the first amplification unit 2A, the delay optical fiber 18A is inserted between the branch coupler 16A and the input monitor 13A and therefore, the variation timing of pumping light power is delayed with respect to that of input signal light power. In contrast, the second amplification unit 2B is configured so that the pumping light source 12B can be controlled by the control circuit 29 in conjunction with control of the pumping light source 12A in the first amplification unit 2A. Thus, the variation timing of pumping light power is set prior to that of input signal light power at the light incident end A of the amplifying optical fiber 11B by the power of pumping light outputted from the amplifying optical fiber 11B being caused to vary by the timing adjustment circuit 290 in conjunction with the control of the pumping light source 12A in the first amplification unit 2A.

Figure 11:
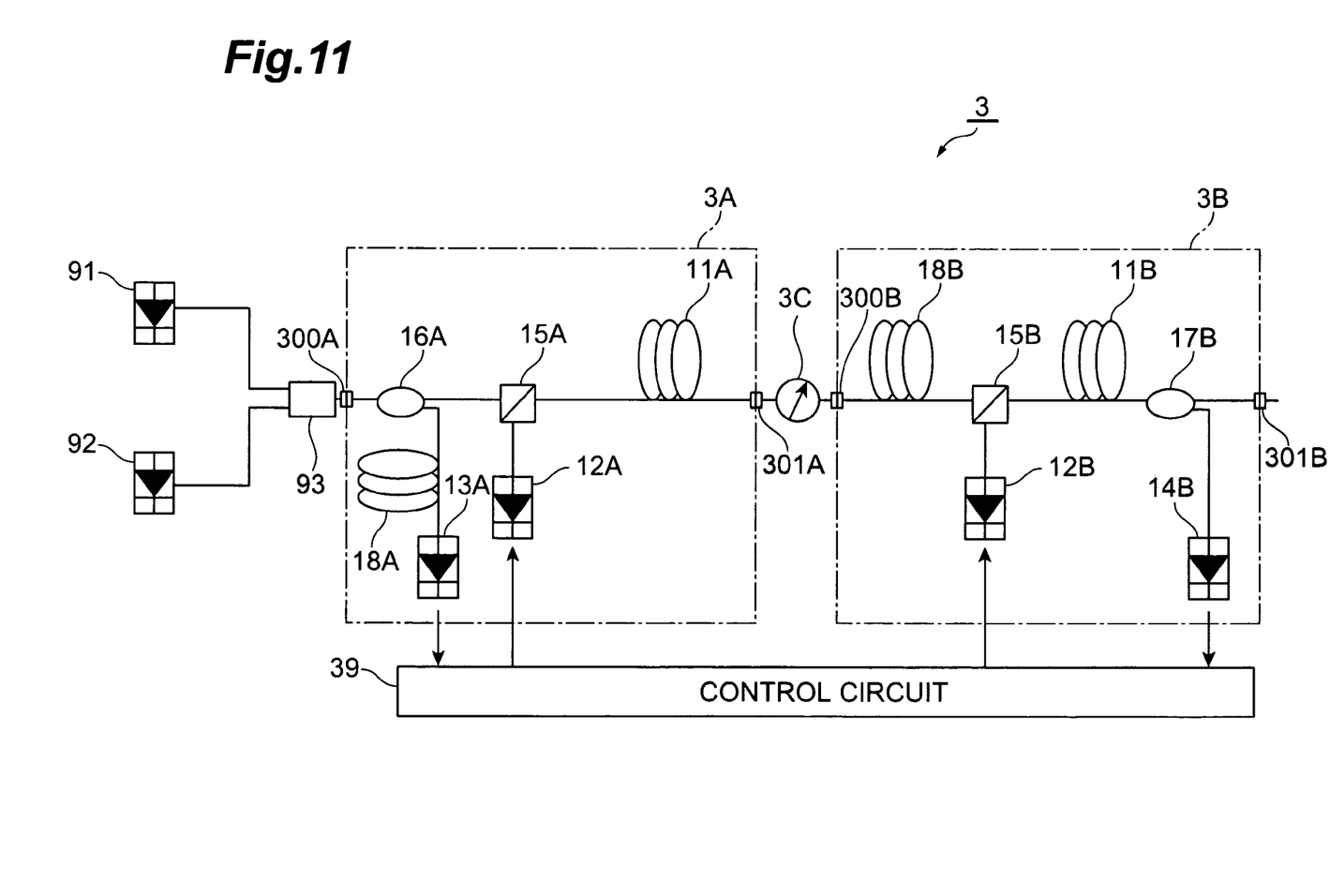
FIG. 11 is a diagram showing the configuration of a third embodiment of an optical amplifier according to the present invention.

FIG. 11 is a diagram showing the configuration of a third embodiment of an optical amplifier according to the present invention. An optical amplifier 3 shown in FIG. 11 includes a first amplification unit 3A, a second amplification unit 3B, a variable optical attenuator 3C, and a control circuit 39. Incidentally, FIG. 11 shows, in addition to the optical amplifier 3, the residual signal light source 91, the modulation signal light source 92, and the multiplexing coupler 93 as well.

The first amplification unit 3A of the front stage (the amplification unit positioned on the upstream side when viewed in a propagation direction of signal light) includes the branch coupler 16A, the multiplexing coupler 15A, and the amplifying optical fiber 11A having the light incident end A and the light outgoing end B arranged on an optical path from an optical input end 300A to an optical output end 301A in this order. Further, the front-stage first amplification unit 3A includes the pumping light source 12A, the input monitor 13A, and the delay optical fiber 18A. The rear-stage second amplification unit 3B (the amplification unit positioned on the downstream side when viewed in a propagation direction of signal light) includes the delay optical fiber 18B, the multiplexing coupler 15B, the amplifying optical fiber 11B having the light incident end A and the light outgoing end B, and the branch coupler 17B arranged on an optical path from an optical input end 300B to an optical output end 301B in this order. Further, the rear-stage second amplification unit 3B includes the pumping light source 12B and the output monitor 14B. The variable optical attenuator 3C is inserted between the first amplification unit 3A and the second amplification unit 3B.

The comparison with the configuration of the optical amplifier 2 according to the second embodiment (FIG. 10) shows that the optical amplifier 3 according to the third embodiment (FIG. 11) is different in that the rear-stage second amplification unit 3B includes the delay optical fiber 18B. In the first amplification unit 3A, the delay optical fiber 18A is inserted between the branch coupler 16A and the input monitor 13A. In the second amplification unit 3B, the delay optical fiber 18B is inserted between the input end and the multiplexing coupler 15B. In the third embodiment, as described above, while the variation timing of pumping light power is delayed with respect to that of input signal light power at the light incident end A of the amplifying optical fiber 11A in the first amplification unit 3A, the variation timing of pumping light power is set prior to that of input signal light power at the light incident end A of the amplifying optical fiber 11B in the second amplification unit 3B.

The delay optical fiber 18B is preferably an optical fiber having a dispersion compensation function. A fiber used for dispersion compensation is generally very long from 100 m to several kilometers and is also used for the delay optical fiber 18B. If the delay optical fiber 18B is provided between the amplifying optical fiber 11A and the amplifying optical fiber 11B like in the present embodiment, it is necessary for the delay optical fiber 18A to be inserted between the branch coupler 16A and the input monitor 13A in the first amplification unit 3A.

The present invention is not limited to the above embodiments and various modifications can be made. For example, the EDFA of 980 nm pumping was described in the above embodiments, but there is no big difference between the EDFA of 980 nm pumping and that of 1480 nm except that the EDFA of 1480 nm pumping shows almost no response delay to signal light power when the pumping light power is changed and thus, the present invention is valid for both the EDFA of 980 nm pumping and that of 1480 nm.

Optical fibers to which the rare earth element erbium is doped are applied in the above embodiments, but even when optical fibers to which another rare earth element (such as thulium (Tm), holmium (Ho), neodymium (Nb), samarium (Sm), and ytterbium (Yb)) is doped are used, the same effects as those of the above embodiments can be obtained because other rare earth elements possess the same principle of optical amplification using stimulated emission caused by a supply of pumping light.

In order to adjust a relationship between the variation timing of input signal light power and that of pumping light power at the light incident end A of the amplifying optical fiber in the amplification unit, in addition to inserting the above delay optical fiber, a timing adjustment circuit for adjusting timing by a circuit configuration or an algorithm in a control circuit for controlling each amplification unit may be provided.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:
1. An optical amplifier comprising:
   (1) a plurality of amplification units optically cascade-connected so as to sequentially amplify signal light of one or more signal channels having mutually different wavelengths, each amplification unit of said plurality of amplification units comprising:

an optical input end for receiving signal light;

an optical output end for outputting the amplified signal light;

an amplifying optical fiber provided on an optical path between said optical input end and said optical output end; and a pumping light source for supplying pumping light entering a light incident end of said amplifying optical fiber together with the signal light; and (2) a timing adjustment system, in each of first and second amplification units selected from said plurality of amplification units, the timing adjustment system setting a delay time of a variation timing of pumping light power with respect to a variation timing of signal light power, wherein the delay time of said first amplification unit is set to positive and the delay time of said second amplification unit is set to negative.

2. An optical amplifier according to claim 1, further comprising a first optical component for delaying amplification light from an amplifying optical fiber contained in a front-stage amplification unit provided between a light outgoing end of said amplifying optical fiber contained in said front-stage amplification unit and a light incident end of an amplifying optical fiber contained in a rear-stage amplification unit, in a configuration of two adjacent amplification units selected from said plurality of amplification units.

3. An optical amplifier according to claim 1, further comprising a control circuit for controlling said pumping light source, wherein said timing adjustment system includes a timing adjustment circuit for controlling the variation timing of pumping light power in said control circuit.

4. An optical amplifier according to claim 1, wherein at least one amplification unit selected from said plurality of amplification units further comprises: a branch unit provided between said optical input end and said light incident end of said amplifying optical fiber contained therein, said branch unit branching part of input light; and an input monitor for monitoring the part of the input light from said branch unit, wherein said timing adjustment system includes a second optical component which is provided between said branch unit and said input monitor, said second optical component securing a delay time of the variation timing of pumping light power with respect to the variation timing of signal light power.

5. An optical amplifier according to claim 1, further comprising: a third optical component provided between a light outgoing end of an amplifying optical fiber contained in said first amplification unit and a light incident end of an amplifying optical fiber contained in said second amplification unit, wherein, in said second amplification unit, said timing adjustment system delays the variation timing of pumping light power with respect to that of signal light power so as to complement a delay of amplification light provided by the third optical component.

* * * * *